United States Patent
Bidaux

(10) Patent No.: US 11,276,517 B2
(45) Date of Patent: Mar. 15, 2022

(54) MULTIPOLE MAGNET, METHOD OF PRODUCING, AND SENSOR SYSTEM COMPRISING SAME

(71) Applicant: Melexis Technologies SA, Bevaix (CH)

(72) Inventor: Yves Bidaux, Yverdon-les-Bains (CH)

(73) Assignee: MELEXIS TECHNOLOGIES SA, Bevaix (CH)

( * ) Notice: Subject to any disclaimer, the term of this patent is extended or adjusted under 35 U.S.C. 154(b) by 270 days.

(21) Appl. No.: 16/435,782

(22) Filed: Jun. 10, 2019

(65) Prior Publication Data

US 2019/0378639 A1    Dec. 12, 2019

(30) Foreign Application Priority Data

Jun. 12, 2018   (EP) ..................................... 18177271

(51) Int. Cl.
| | |
|---|---|
| *H01F 7/02* | (2006.01) |
| *G01B 7/30* | (2006.01) |
| *G01D 5/14* | (2006.01) |
| *H01F 41/02* | (2006.01) |

(52) U.S. Cl.
CPC ............ *H01F 7/0273* (2013.01); *G01B 7/30* (2013.01); *G01D 5/145* (2013.01); *H01F 41/028* (2013.01)

(58) Field of Classification Search
CPC ...... H01F 7/0273; H01F 7/0205; H01F 7/021; H01F 13/003; H01F 41/028; H01F 41/0273; G01D 5/145; G01B 7/30
See application file for complete search history.

(56) References Cited

U.S. PATENT DOCUMENTS

| | | |
|---|---|---|
| 4,470,031 A | 9/1984 | Steingroever et al. |
| 2002/0021124 A1 | 2/2002 | Schott et al. |
| 2013/0179117 A1 | 7/2013 | Delbaere et al. |
| 2015/0226581 A1* | 8/2015 | Schott .................... G01D 5/145 324/207.2 |
| 2018/0087926 A1 | 3/2018 | Ausserlechner |
| 2018/0135961 A1* | 5/2018 | Vandersteegen ......... G01B 7/30 |

FOREIGN PATENT DOCUMENTS

| | | |
|---|---|---|
| EP | 3321638 A1 | 5/2018 |
| WO | 9854547 A1 | 12/1998 |
| WO | 2014029885 A1 | 2/2014 |

OTHER PUBLICATIONS

European Search Report from EP Application No. 18177271, dated Dec. 18, 2018.

* cited by examiner

*Primary Examiner* — Amy He
(74) *Attorney, Agent, or Firm* — Workman Nydegger

(57) ABSTRACT

A permanent magnet in the form of a multi-pole magnet, comprising an isotropic magnetic material, having a central axis, magnetised such that the magnetic field, considered on a virtual circle lies substantially in a virtual plane tangential to the circle, and rotates inside that virtual plane, depending on the position on the circle. A method of producing a magnet comprising: a) providing a shaped body comprising an isotropic magnetic material; b) providing at least four electrical conductor segments; c) simultaneously make currents flow in each conductor segment. A magnet made in this way. Use of such a magnet for angular position sensing. An angular position sensor system comprising such a magnet.

22 Claims, 11 Drawing Sheets

FIG 2(c) $$\begin{pmatrix} Br_x \\ Br_y \\ Br_z \end{pmatrix} = Br_{anisotropic} \begin{pmatrix} 0 \\ 0 \\ sign(\sin(2\theta)) \end{pmatrix}$$

FIG 4(c) $\begin{pmatrix} Br_x \\ Br_y \\ Br_z \end{pmatrix} = Br_{isotropic} \begin{pmatrix} \sin(\theta)\cos(2\theta) \\ -\cos(\theta)\cos(2\theta) \\ \sin(2\theta) \end{pmatrix}$ FIG 4(d) $\theta_m = \arctan 2 \left( \dfrac{\dfrac{\delta B_x}{\delta y} + \dfrac{\delta B_y}{\delta x}}{\dfrac{\delta B_x}{\delta x} - \dfrac{\delta B_y}{\delta y}} \right) / 2$

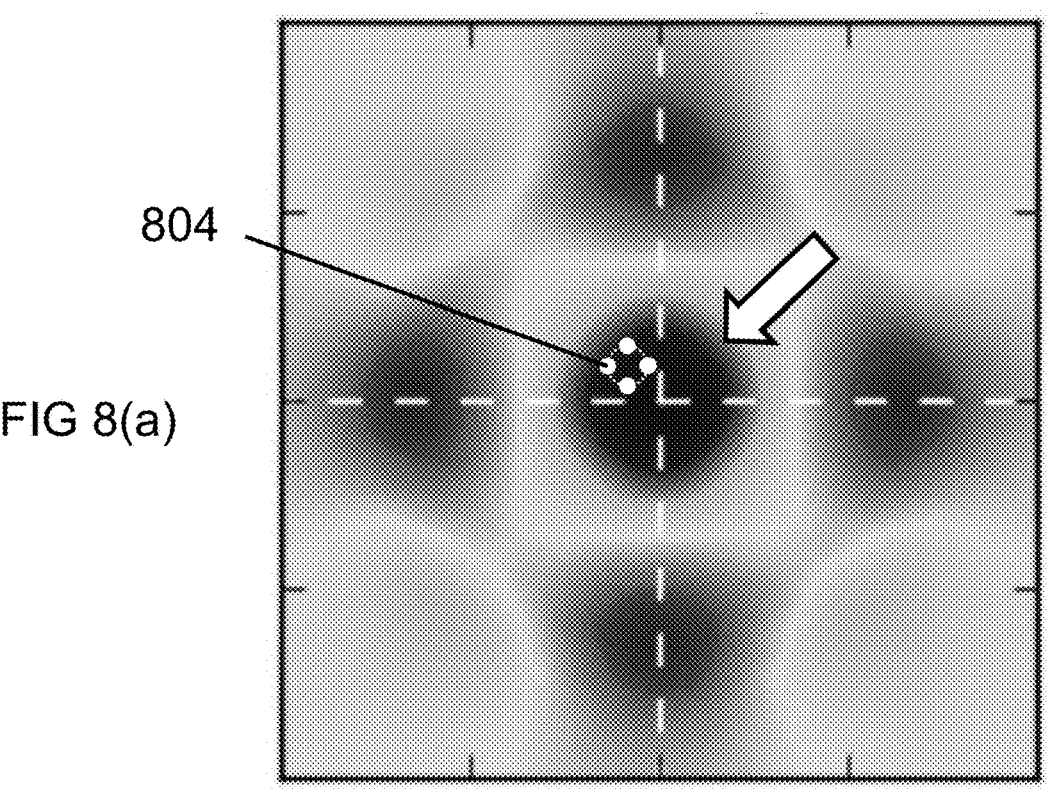
FIG 8(a)
804
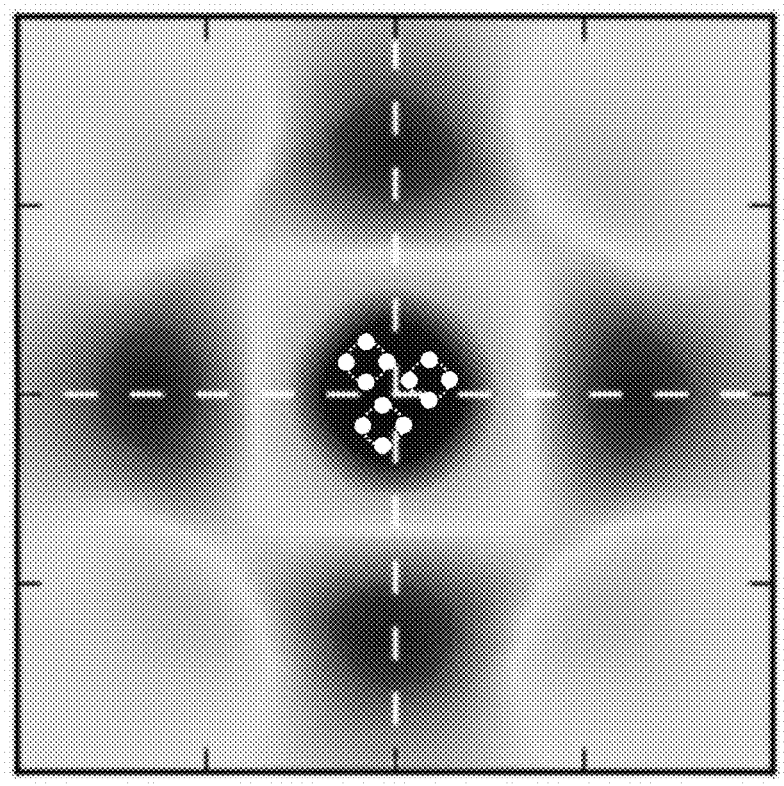
FIG 8(b)
FIG 8

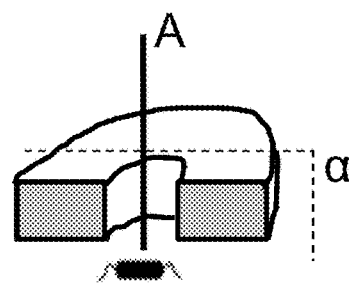
FIG 9(a)
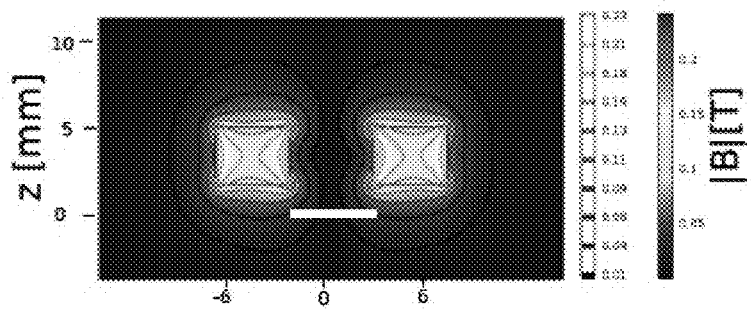
FIG 9(b)
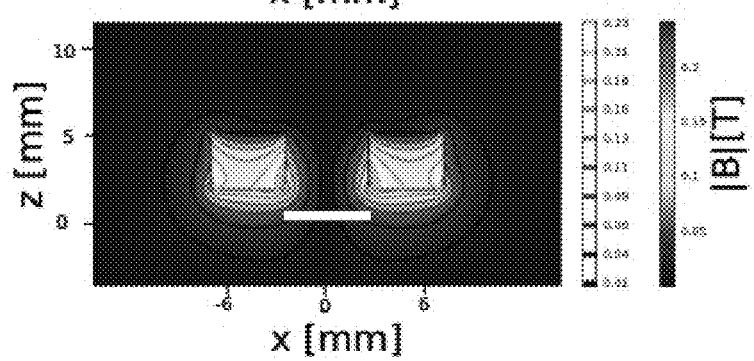
FIG 9(c)
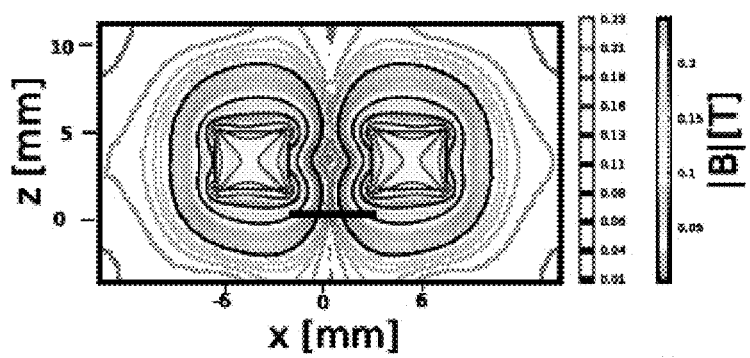
FIG 9(d)
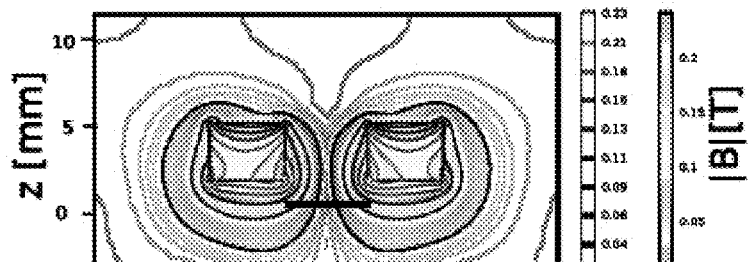
FIG 9(e)
FIG 9

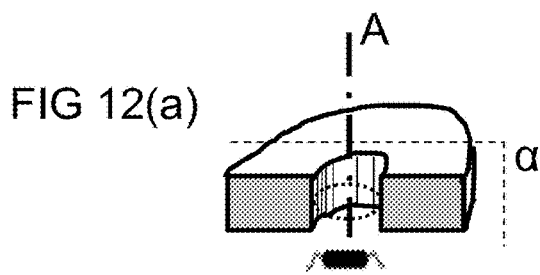
FIG 12(a)
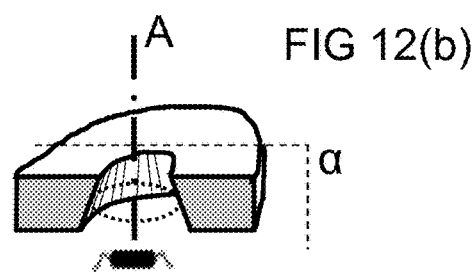
FIG 12(b)
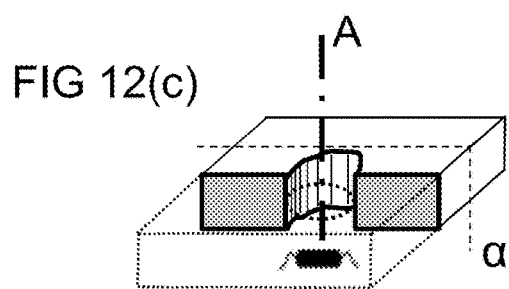
FIG 12(c)
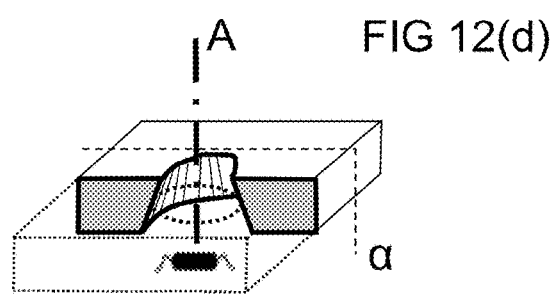
FIG 12(d)
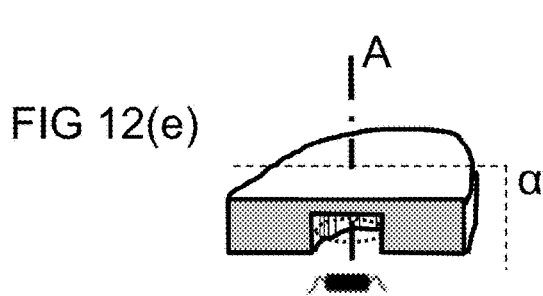
FIG 12(e)
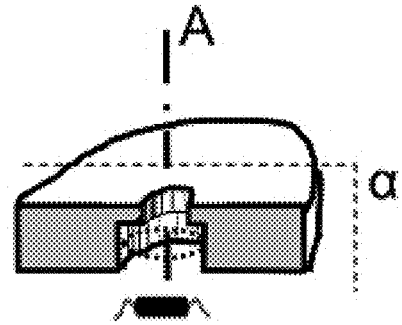
FIG 12(f)
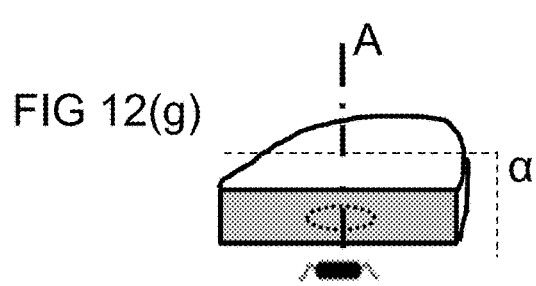
FIG 12(g)
FIG 12

MULTIPOLE MAGNET, METHOD OF PRODUCING, AND SENSOR SYSTEM COMPRISING SAME

FIELD OF THE INVENTION

The present invention relates in general to the field of multipole permanent magnets, methods of making them, and sensor systems containing them, in particular an angular position sensor system.

BACKGROUND OF THE INVENTION

Sensor systems, in particular linear or angular position sensor systems are known in the art. In such systems typically a non-uniform magnetic field is generated (e.g. by means of a static electrical current, or by means of a permanent magnet) and is measured by a sensor device comprising one or more sensor elements and a readout circuit and a processor which calculates a linear or angular position based on the measured values.

Various sensor arrangements and various techniques for determining an angular position are known in the art, each having its advantages and disadvantages, for example in terms of cost, compactness, angular range, accuracy, signal sensitivity, robustness against unwanted external fields, robustness against position errors (e.g. axial distance and/or radial offset), processing complexity, etc.

For example, US2002021124A1 describes a sensor for the detection of the direction of a magnetic field, using a magnetic field concentrator and horizontal Hall-effect elements.

WO9854547A1 describes a magnetic rotation sensor with four sensor elements, arranged near a two-pole magnet. An angular position is calculated as an arctan function of a ratio of difference signals. This arrangement is said to be robust against offset and sensitivity variations, and against a constant external magnetic field.

WO2014029885A1 describes a sensor arrangement for measuring an absolute angular position using a multi-pole magnet. Some embodiments described herein are highly robust against position errors, and/or robust against a constant external magnetic field, and/or robust against a constant external field gradient, for example by using a more complex algorithm, and/or by using a more complex magnet and/or by using a higher number of sensor elements.

There is always room for improvements or alternatives.

SUMMARY OF THE INVENTION

It is an object of embodiments of the present invention to provide a permanent magnet suitable for use in an angular position sensor system, and a method of producing such a magnet, and a magnet made according to this method, and a position sensor system comprising such a magnet.

It is a particular object of embodiments of the present invention to provide a sensor system (e.g. an angular position sensor system) which is highly robust or more robust against position errors (e.g. deviations in axial distance and/or radial off-axis position with respect to a magnet) and/or against position error drift over time.

It is also an object of embodiments of the present invention to provide a sensor system which is more accurate (for a given axial distance and/or radial offset) during the lifetime of the sensor system (as compared to existing systems), despite mechanical drift (position variations), and/or in the presence of vibrations.

It is an object of particular embodiments of the present invention to provide an angular position sensor system comprising a multi-pole ring magnet and a sensor device, wherein a position error of the sensor device and the ring magnet (e.g. axial shift and/or radial offset) due to mechanical drift and/or mechanical wear and/or mechanical vibrations, is reduced.

These objectives are accomplished by a multi-pole permanent magnet, and a method of producing such a magnet, and by a magnet made by such method, and by a sensor system comprising such a magnet according to embodiments of the present invention.

According to a first aspect, the present invention provides a permanent magnet in the form of a multi-pole magnet, wherein the magnet comprises an isotropic magnetic material; the magnet has an axis; the magnet is magnetized such that the magnet creates a remanent magnetic field which, for each point of an imaginary circle located in a plane perpendicular to said axis and having a centre substantially located on said axis, is located substantially in a virtual plane tangential to said virtual circle in said point and parallel to said axis, which magnetic field furthermore defines an angle relative to the plane containing the circle, which angle rotates as a function of the position of the point on the imaginary circle.

Preferably the multi-pole magnet is at least a quadrupole as seen from a point on said axis, at a distance from the magnet (e.g. about 1.5 mm).

The axis is preferably a central axis of the magnet body.

While ideally the magnetic field vector is located exactly in a virtual plane tangential to said virtual circle, in practice there is always some deviation. With "located substantially in a virtual plane tangential to said virtual circle" is meant that the orientation of the actual magnetic field vector forms an angle with the tangential plane smaller than 30°, or smaller than 25°, or smaller than 20°, or smaller than 15°, or smaller than 10°, or smaller than 5°.

It is an advantage of this magnet that a more homogeneous or a more ideal signal is generated, allowing a sensor system comprising this magnet to be more robust against position errors of the sensor device with respect to the magnet, and more robust against ageing effects, such as mechanical wear, and more robust against vibrations.

More specifically, it is an advantage of this magnet that it provides a magnetic field having in-plane field gradients which are substantially constant (at least in a cylindrical space at a relatively small distance from the magnet and close to the axis). Such a magnet is ideally suited for use in a linear or angular sensor system, having a reduced sensitivity to axial distance variations ("airgap") and/or radial offset ("off-axis").

With "the magnetic field . . . is located in a plane" is meant that the "magnetic field vector" is located in said plane.

In an embodiment, the magnet is made of an isotropic magnetic material, or entirely made of an isotropic magnetic material. A magnet made of a single material is easier to produce. The material can for example be Neodymium or Ferrite, but other isotropic magnetic materials can be used as well.

In an embodiment, the magnetic field is rotation symmetric about the axis with a period of 360°/2=180° or with a period of 360°/3=120° or with a period of 360°/4=90°, or in general a period of 360°/N, where N is an integer value equal to 2 or 3 or 4 or 5 or 6. For example, a so called "four-pole ring magnet or a four-pole disk magnet", has a rotational symmetry of 360°/2=180°, because the magnetic field (as seen by a sensor device located near the axis) will look the same if the ring magnet is rotated over 180° about its axis. The period would be 120° for a six-pole magnet, etc.

In an embodiment, the magnet has an opening or a cut-out with a tubular shape; and the imaginary circle is defined as the cross section of said plane perpendicular to the axis, and said tubular shape. With "cut-out" is meant for example a blind hole. Without "opening" is meant a through-hole.

In an embodiment, the tubular opening or cut-out is a surface of revolution about said axis.

In an embodiment, the tubular opening or tubular cut-out is a cylindrical through-hole or a conical through-hole or a cylindrical cut-out or a conical cut-out. It is an advantage of using a cylindrical or conical cut-out or through-hole because such an opening or cut-out can easily be produced, e.g. by drilling or milling.

In an embodiment, said angle rotates monotonically as a function of the position of the point on the imaginary circle.

In an embodiment, said angle rotates substantially linearly as a function of the position of the point on the imaginary circle. It is an advantage of a magnet where the angle beta rotates substantially linearly as a function of the angular position theta, because this is easier to calculate, for example using "linear interpolation" of tabular data rather than using goniometric functions. This typically means a higher accuracy can be achieved with a given code-size or a given table-size.

In an embodiment, the remanent magnetic field has magnetic field components which, at points located on said circular cross section, can be expressed by the following set of formulas, or an equivalent set of formulas:

$$\begin{pmatrix} Br_x \\ Br_y \\ Br_z \end{pmatrix} = Br_{isotropic} \begin{pmatrix} \sin(\theta)\cos(N\theta/2) \\ -\cos(\theta)\cos(N\theta/2) \\ \sin(N\theta/2) \end{pmatrix}$$

where N is an even integer number of at least 4 (e.g. N=4, or N=6, or N=8), Brx, Bry and Brz is an x, y and z-component respectively of the remanent magnetic field, Brisotropic is a magnitude of the remanent magnetic field, and θ is an angle about the axis.

In an embodiment, N is equal to 4, in which case the magnetisation can be expressed by the following formula:

$$\begin{pmatrix} Br_x \\ Br_y \\ Br_z \end{pmatrix} = Br_{isotropic} \begin{pmatrix} \sin(\theta)\cos(2\theta) \\ -\cos(\theta)\cos(2\theta) \\ \sin(2\theta) \end{pmatrix}$$

It is noted that in this case, the angle β between the magnetic field vector B and the plane λ varies twice as fast as the angular position θ of the point p on the imaginary circle c.

In an embodiment, an outer surface of the permanent magnet has a circular or a regular polygonal cross section with the plane that contains the virtual circle, for example a square or a hexagon or an octagon. The outer surface may be a cylindrical surface, or a conical surface, or a pyramidal surface.

According to a second aspect, the present invention provides a method of producing a permanent magnet in the form of a multi-pole magnet having an axis, the multi-pole magnet having a plurality of at least four poles as seen from a point on said axis; the method comprising the following steps: a) providing a shaped body comprising or consisting of an isotropic magnetic material, the shaped body having an axis and a centre; b) providing a number of at least four electrical conductor segments arranged in a plane perpendicular to said axis, the conductor segments being oriented radially with respect to said axis, and being angularly spaced by an angle of 360° divided by said number; c) simultaneously applying or inducing or otherwise make currents flow through each of said number of conductor segments, the currents in the even numbered conductor segments flowing towards the axis, the current in the odd numbered conductor segments flowing away from said axis.

Preferably the currents are of substantially equal magnitude, for example at least 1 kA, or at least 2 kA, or at least 5 kA, or at least 10 kA, or at least 20 kA, or at least 30 kA, or at least 40 kA, or at least 50 kA, or at least 60 kA.

The plane is preferably located at a distance of at most 5.0 mm from a surface of the shaped object, preferably at most 4.0 mm, or at most 3.0 mm, or at most 2.0 mm.

To make a four-pole magnet (N=4), four conductor segments can be used, spaced 90° apart.

To make a six-pole magnet (N=6), six conductor segments can be used, spaced 60° apart, etc.

In an embodiment, the shaped body provided in step a) furthermore comprises a plurality of radially oriented grooves for accommodating said electrical conductor segments; and step b) further comprises: at least partially inserting the plurality of electrical conductor segments inside said grooves.

According to a third aspect, the present invention also provides a permanent magnet produced or producible by a method according to the second aspect.

In an embodiment, the magnet is a multi-pole ring magnet that creates a magnetic field that is oriented in the direction of the positive Z axis in two angular positions; and that is oriented in the direction of the negative Z axis in two angular positions; and that is oriented in the direction of the positive X axis in one angular position; and that is oriented in the direction of the negative X axis in one angular position; and that is oriented in the direction of the positive Y axis in one angular position; and that is oriented in the direction of the negative Y axis in one angular position, where the X, Y and Z axis are orthogonal axes of a Cartesian coordinate system located in the centre of which the Z-axis coincides with the axis of the magnet.

According to a fourth aspect, the present invention also provides a sensor system comprising: a permanent magnet according to the first aspect or the third aspect; a sensor device arranged at an axial distance from said magnet, and at a radial offset from said axis, and adapted for determining at least one magnetic quantity or at least one derived quantity created by said magnet.

It is an advantage of using a permanent magnet, because it allows to create a magnetic field in a passive manner, i.e. without consuming power.

It is an advantage that this sensor system is more robust to mechanical drifts, as compared to a sensor system with a "vertically magnetized anisotropic permanent magnet".

It is an advantage that, for a given radial offset and/or axial distance, the error is reduced as compared to a sensor system with a "vertically magnetized anisotropic permanent magnet".

The magnetic quantity can for example be a magnetic field component Bx or By or Bz (in an orthogonal axis system) or Br (radial component) or Bt (tangential component, perpendicular to the radial component). The derived magnetic value can for example be a magnetic field gradient, more specifically, a spatial field gradient measured in a plane perpendicular to said axis. The "at least one derived quantity" can for example be one or more or all of the following spatial field gradients: dBx/dx, dBx/dy, dBy/dx and dBy/dy. The sensor system can for example be a linear position sensor system, or an angular position sensor system. Preferably the sensor device is an integrated chip (IC) containing a semiconductor device, e.g. a CMOS device.

In an embodiment, the sensor device comprises at least three magnetic sensor elements located in a plane perpendicular to the axis of the magnet, the at least three magnetic sensor elements not being collinear.

In an embodiment, the sensor device comprises at least four sensor elements, located on a circle, for example as described in WO2014029885A1, but the present invention is not limited to such sensor devices, and other sensor devices capable of measuring in-plane field gradients and deriving an angular position therefrom, can also be used.

In an embodiment, the sensor device comprises at least two sets of at least three magnetic sensor elements, the at least three magnetic sensor elements of each set not being collinear. It is an advantage of this embodiment that the sensor device provides redundancy, thereby allow fault-detection or even fault-correction.

In an embodiment, the sensor system is an angular position sensor system.

In an embodiment, the sensor device is adapted for determining one or more field gradients of the magnetic field created by the magnet, in a plane perpendicular to the axis, and is adapted for determining an angular position of the sensor device relative to the permanent magnet, based on said field gradients.

In an embodiment, the angular position is calculated based on the following formula or an equivalent formula:

$$\theta_m = \arctan2\left(\frac{\frac{\delta B_x}{\delta y} + \frac{\delta B_y}{\delta x}}{\frac{\delta B_x}{\delta x} - \frac{\delta B_y}{\delta y}}\right) / (N/2)$$

where N is an even integer number of at least 4 (e.g. N=4, or N=6, or N=8), θm is the calculated angular position of the sensor device (102) relative to the magnet (101), and wherein dBx/dy, dBy/dx, dBx/dx and dBy/dy are in-plane field gradients.

In an embodiment, N is equal to 4, in which case the angular position can be calculated by the following formula or an equivalent formula:

$$\theta_m = \arctan2\left(\frac{\frac{\delta B_x}{\delta y} + \frac{\delta B_y}{\delta x}}{\frac{\delta B_x}{\delta x} - \frac{\delta B_y}{\delta y}}\right) / 2$$

In an embodiment, the permanent magnet further comprises two vertically magnetized dipoles arranged on opposite sides of the isotropic magnet body for allowing determination of an angular position within a 360° range. This embodiment combines the advantages of the present invention with the "angular range extension principle" described in EP3321638(A1), thereby overcoming the intrinsic 180° range limitation of a quadrupole, or intrinsic 120° range limitation of a six-pole magnet.

According to a fifth aspect, the present invention is also directed to the use of a magnet as described above for angular position sensing.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

BRIEF DESCRIPTION OF THE DRAWINGS

FIG. 1(a) shows a top view of a ring magnet having an axis and four poles, as seen from a point located on said axis. The magnetisation of this magnet is better shown in FIG. 6(c).

FIG. 1(b) shows a side view of the four-pole ring magnet of FIG. 1(a), arranged relative to a sensor device and located at an axial distance dz from the ring magnet, and at a radial offset dr from a central axis of the ring magnet.

FIG. 2(c) shows mathematical formulas that describe the magnetic field components in the X, Y and Z direction of the axially magnetized anisotropic magnet shown in FIG. 2(a).

FIG. 6(a) and FIG. 6(b) show a ring magnet having a central axis A, and a virtual circle having a centre on the axis, and a point on that circle, and a plane parallel to the axis A and tangential to the virtual circle containing said point, and a magnetic field vector located in that tangential plane.

FIG. 6(c) shows several points on the virtual circle, and shows how the magnetic field vector "rotates" inside the tangential plane as the point moves along the circle, or for different points on that circle.

FIG. 6(d) shows the magnetic field vector in eight specific locations on the ring magnet of FIG. 6(a), spaced 45° apart.

FIG. 6(e) is a 2D representation showing how the magnetic field vector of the magnet of FIG. 6(a) "rotates" inside the tangential planes, as a function of the angular position.

FIG. 6(f) is a 2D representation similar to that of FIG. 6(e), but for the vertically magnetised anisotropic magnet of FIG. 2, for comparison.

FIG. 8(a) is a grayscale version of an enlarged view of the plot dBx/dy of FIG. 7 for the so called "isotropic magnet with rotating magnetic field" according to an embodiment of the present invention. The four white dots represent sensor elements of a sensor device that may be arranged relative to the magnet in the central circular area, but with a certain radial offset.

FIG. 8(b) is a schematic representation of the relative position of a magnet and a sensor device comprising two or three sensor structures, as may be used in some embodiments of the present invention.

FIG. 9(a) shows the magnet portion of FIG. 6(b) arranged relative to a sensor device. (only a portion is shown for illustrative purposes).

FIG. 9(b) and FIG. 9(d) show computer-simulations of the magnitude |B| of the magnetic field of the "anisotropic quadrupole ring magnet with vertical magnetisation" of FIG. 2, in color and in grayscale respectively. As can be seen, the field is equally strong at the bottom and at the top side.

FIG. 9(c) and FIG. 9(e) show computer-simulations of the magnitude |B| of the magnetic field of the "isotropic quadrupole ring magnet with rotating magnetic field" as in FIG. 4 to FIG. 8, in color and in grayscale respectively. As can be seen, the field is stronger at the bottom than at the top side.

FIG. 12 shows several alternative shapes of an "isotropic magnet with rotating magnetic field" as can be used in embodiments of the present invention. Only a portion of the magnet is shown for illustrative purposes. In FIG. 12(a) the magnet is a ring magnet with a cylindrical through-opening and a cylindrical outer wall. In FIG. 12(b) the magnet is a ring magnet with a conical through-opening and a cylindrical outer wall. In FIG. 12(c) the magnet has a cylindrical through-opening in a beam-shaped object having an outer surface with a square cross-section. In FIG. 12(d) the magnet has a conical through-opening in a beam-shaped object having an outer surface with a square cross-section. In FIG. 12(e) the magnet is a disk magnet with a central cut-out in the form of a cylinder. In FIG. 12(f) the magnet has a cylindrical through opening with a first diameter, and has a concentric cut-out with a second diameter. In FIG. 12(g) the magnet is a circular disk magnet without a central opening or cut-out.

Figure 1:
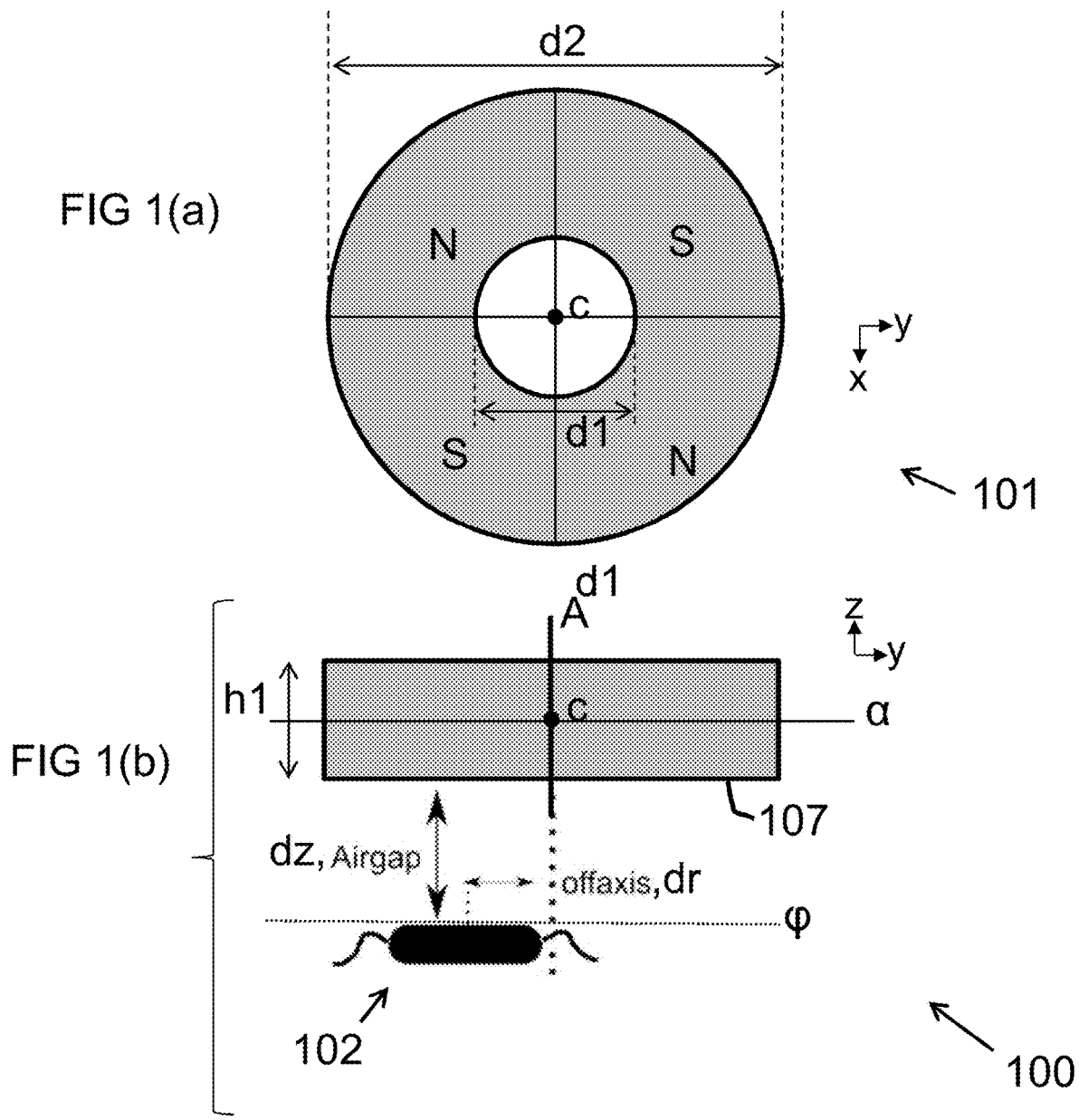
FIG. 1 shows a multipole ring magnet according to an embodiment of the present invention, and shows a sensor system according to an embodiment of the present invention, comprising that magnet and a sensor device.

The drawings are only schematic and are non-limiting. In the drawings, the size of some of the elements may be exaggerated and not drawn on scale for illustrative purposes. Any reference signs in the claims shall not be construed as limiting the scope. In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly, it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Figure 2A:
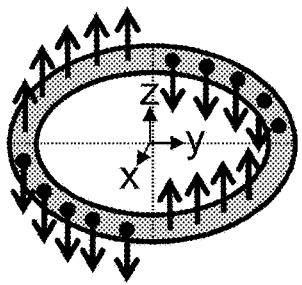
FIG. 2(a) shows a classical ring magnet made of an anisotropic magnetic material, which is axially magnetized (also referred to herein as "vertical magnetisation").

In this document, the expression "vertically magnetised ring magnet" means the same as "axially magnetised ring magnet", as shown for example in FIG. 2(a).

The present invention relates to permanent multi-pole magnets for use in a sensor system, e.g. for use in an angular position sensor system 100, and to a method of producing such a magnet, and to magnets produced using that magnet, and to sensor systems comprising such a permanent multi-pole magnet and a sensor device arranged at a distance from the magnet.

The sensor system 100 may be a linear or an angular position sensor system comprising a multi-pole ring or disk magnet 101, and comprising a sensor device 102, for example in the form of an integrated circuit comprising at least three or at least four sensor elements 804 for measuring one or more values of the magnetic field generated by the permanent magnet, and/or for measuring or calculating values derived therefrom (for example a field gradient can be measured by a differential circuit, or can be calculated by adding or subtracting several values, analog or digital). The sensor device 102 typically also comprises a processor for calculating a linear or angular position based on those measured and/or calculated values, but such processing is not the main focus of the present invention.

As suggested in the background section, it is highly desirable to build a sensor system 100 which is capable of measuring a value (e.g. a linear position or an angular position value) with high accuracy, in a manner which is highly robust against position offset (e.g. of the sensor device 102 with respect to the magnet 101), and which is highly robust against sensitivity variations (e.g. absolute magnetic field strength), and which is highly robust against a disturbance field, in particular a constant external magnetic field (i.e. having a constant amplitude and orientation), and preferably also highly robust against a constant field gradient. Many sensor systems exist in the prior art, addressing some of these requirements.

As component sizes are continuously decreasing (e.g. for ring magnet with an outer diameter smaller than 30 mm, or smaller than 25 mm, or smaller than 20 mm, or smaller than 15 mm), it becomes increasingly more difficult to correctly position components which are movable relative to each, in an economical manner, especially in a production environment. It is a major challenge to conceive or develop sensor systems or sensor arrangements that are highly insensitive to position errors (e.g. axial distance between the magnet and the sensor device, also referred to herein as "axial distance" or "airgap"; and/or highly insensitive to a varying radial distance relative to an axis of the magnet, also referred to herein as "radial offset" or "offaxis"). Yet, such sensor systems would be easier to mount because tolerances can be relaxed.

It is even more challenging to create a sensor system which is robust against mechanical drift over the lifetime of the sensor system. While initial mounting errors due to misalignment of the sensor device and the magnet can be handled by means of a calibration test during production, where values (related to the particular offset) are measured and stored in the sensor device for later use and angular correction in the application, this solution no longer works if one or both of the axial distance "dz" and/or radial offset "dr" drifts over time, for example due to mechanical drift or wear, or due to vibrations. The known solutions using calibration can no longer be used, because the offset-position is unknown.

The inventors of the present invention were confronted with the problem of designing a sensor system (and parts thereof) which is more robust against positioning errors, preferably without significantly decreasing the accuracy of the sensor system and/or preferably without significantly decreasing the robustness against an (unwanted) constant external field and/or preferably without decreasing the robustness against an (unwanted) external field gradient.

The inventors came to the idea of providing a sensor system 100 (see FIG. 1) comprising a sensor device 102 and a multipole magnet 101 comprising or consisting of an isotropic magnetic material, which is magnetized in a very specific manner. The sensor device 102 is arranged at a distance (e.g. from about 0.5 to 5.0 mm, e.g. at about 1.5 mm) from said multipole magnet 101, and is adapted for measuring or determining at least one quantity of said magnetic field, and/or for measuring or determining values derived therefrom, for example an in-plane magnetic field component Bx, By, or an out-of-plane field component Bz, or an in-plane field gradient dBx/dy, dBy/dx, dBx/dx, dBy/dy, dBz/dx, dBz/dy or an out-of-plane gradient dBz/dz, dBx/dz, dBy/dz, or combinations hereof.

More specifically, as will be explained in more detail in FIG. 6, the magnet has a central axis A, and is magnetized such that the magnetic field vector B, for each point p of an imaginary circle c located in a plane λ perpendicular to said axis A and having a centre m substantially located on said axis A, is located in a virtual plane ε tangential to said virtual circle c in point p and parallel to said axis A, which magnetic field vector B furthermore defines an angle β relative to the plane λ that contains the circle, which angle β rotates as a function of the position θ of the point p on the imaginary circle c. This is visualized in FIG. 6(c) and FIG. 6(d).

Simulations have shown that, very surprisingly, this magnetic field makes at least some of the magnetic quantities mentioned above, significantly more homogeneous or more constant in a limited space near the magnet, more particularly within a cylindrical space located at a distance dz in the range from about 0.5 mm to about 8.0 mm or about 1.0 to about 5.0 mm from the magnet, the cylindrical region having a radius less than 15 mm, or less than 10 mm, or less than 5.0 mm, or less than 4.0 mm, or less than 3.0 mm, or less than 2.0 mm, or less than 1.5 mm, or less than 1.0 mm. As shown in FIG. 7 (bottom left), the results are actually astonishing. Apart from the fact that it is even possible to make a magnetic field with a "rotating vector" as described above (FIG. 6b), the fact that the resulting in-field-gradients dBx/dy and dBy/dx are extraordinary constant (see FIG. 7 bottom left and FIG. 8), could not have been anticipated. Moreover, as will be described in more detail in FIG. 9(e), it came as another surprise that the "rotating magnetic field" also provides an amplification effect at the bottom side of the magnet. Also this could not have been anticipated.

It is explicitly pointed out that the principles of the present invention do not require a specific sensor device, but will work with any sensor device 102 capable of measuring and/or processing in-plane field gradients to determine a linear or angular position.

As an example only, and without limiting the present invention thereto, a sensor device 102 as can be used in embodiments of the present invention may comprise a plurality of vertical Hall elements arranged around a circle and oriented for measuring a radial field component Br, or a plurality of vertical Hall elements arranged around a circle and oriented for measuring a tangential field component Bt, or a plurality of horizontal Hall elements with IMC for measuring a radial or tangential field component Br, Bt or another in-plane field component Bx, By, or other suitable sensor elements, for example as described in WO2014029885A1, which document is incorporated herein by reference in its entirety; and comprising a circuit or a processor for calculating a linear position or an angular position based on the measured values, for example using an arctan or arctan 2 function (also known as an inverse tangent function), or using a Fourier transformation or inverse Fourier transformation, or using any other suitable mathematical function or algorithm.

Figure 2B:
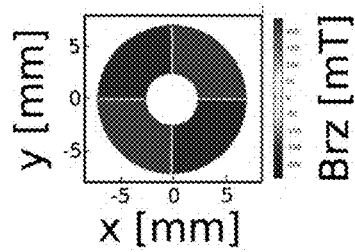
FIG. 2(b) is a computer plot showing the magnitude of the Z-component of the remanent magnetic field of the magnet of FIG. 2(a).

For completeness, when it is mentioned herein that the magnetic field has N poles, what is actually meant is that the sensor device 102 when arranged on or at a (relatively small) radial distance "dr" from the axis "A" and at an axial distance "dz" from the magnet (as shown in FIG. 1), can "see" or measure or experience N poles. Thus, for example the so called "axially magnetized anisotropic ring magnet" of FIG. 2, also referred to herein as "vertically magnetized anisotropic ring magnet", is a quadrupole, because (as shown in FIG. 2b) the magnetic field component Bz has two North and two South poles. Such a ring magnet is commonly referred to as a "four pole ring magnet". Likewise, the "isotropic ring magnet with rotating magnetization" of FIG. 5(c) also has four poles, and therefore also is a quadrupole. The fact that the Bx and By field components only have two poles (one North pole and one South pole) is irrelevant.

The invention will be described for the example of a four-pole ring magnet for ease of the description, but the principles of the present invention are not limited to four-pole magnets (quadrupole), but are also applicable for six-pole magnets or eight-pole magnets or even higher order magnets, and the magnet does not need to be a ring magnet with a cylindrical central opening, but will also work for other shapes, such as for example a disk magnet with a cylindrical cut-out (see FIG. 12e).

In the examples described herein, the dimensions of the ring magnet are as follows (see FIG. 1): thickness h1=3.5 mm, inner diameter d1=5.0 mm, outer diameter d2=14.0 mm, but of course the present invention is not limited thereto, and other dimensions can also be used.

Referring to the Figures.

FIG. 1(a) shows a top view and FIG. 1(b) shows a side view of an exemplary four-pole ring magnet 101 comprising or made of an isotropic magnetic material (e.g. Neodymium or Ferrite) which is magnetized in a specific manner which will be described further (in FIG. 4a and FIG. 4b), resulting in a magnetic field having very interesting and completely unexpected properties, which can be used to great advantage in the sensor system shown in FIG. 1(b).

FIG. 1(b) shows a side view of the four-pole ring magnet of FIG. 1(a), and also shows a sensor device 102, in the example of FIG. 1(b) an integrated semiconductor device 102, located at an axial distance "dz" (also called "airgap") from a surface 107 of the ring magnet 101. The sensor device 102 (or actually a central point thereof defined by sensor elements 804 inside the sensor device) is positioned with a radial offset "dr" (also called "off-axis") from the central axis A of the ring magnet 101. Ideally, the sensor device 102 is to be mounted at a predefined distance dz from the surface 107, for example dz=1.50 mm, and with zero radial offset with respect to the central axis A, meaning dr=0.00 mm, but in practice the axial distance dz and the radial distance dr will slightly vary from this ideal mounting position. As already mentioned above, a constant offset dz and dr can easily be handled by a calibration test during production where certain values are measured and stored, which values are then retrieved and used during normal operation, but an offset drift over time, is currently not addressed.

The inventors came to the idea of addressing the problem related to incorrect positioning (axial distance and/or radial offset with respect to the envisioned position) and mechanical drift not in the sensor device 102, but primarily in the multi-pole magnet, which is uncommon taking into account that integrated circuits can implement very complex algorithms, whereas a magnet cannot.

Figures 2, 3:
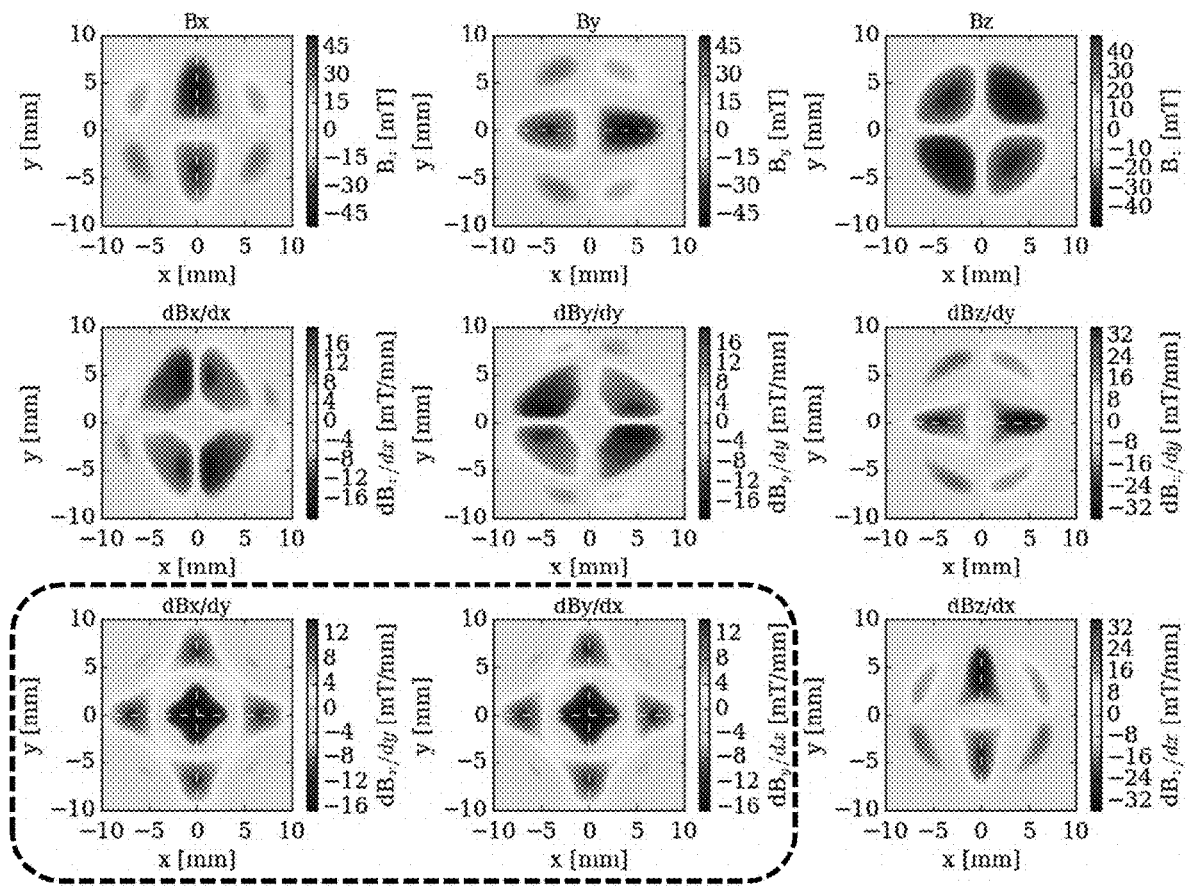
FIG. 3 shows simulated plots of magnetic field values Bx, By, Bz of the magnetic field generated by the axially magnetized anisotropic magnet shown in FIG. 2(a) as can be measured in a plane located at a distance of 1.5 mm from the magnet, and also shows spatial field gradients dBx/dx, dBx/dy, dBy/dy, dBy/dx, dBz/dy, dBz/dx derived therefrom.

Furthermore, it is well known that the remanent magnetic field strength of isotropic ferrite material is typically limited to about 120 mT maximum in the three directions X, Y, Z, whereas anisotropic ferrite material typically has a remanent magnetization of about 230 mT along the preferred axis, for example the Z-axis for the "vertically magnetized" ring magnet of FIG. 2. It is also well known that a weaker magnetic field normally means: weaker electrical signals, requiring larger amplification, larger errors, more sensitive to external disturbances, etc. Thus, using a magnet with an isotropic magnetic material to solve the problem of providing a permanent magnet for a sensor system that needs to be more accurate and/or less sensitive to mechanical drift, and/or less sensitive to external magnetic fields, and preferably all of these, is not the logical choice, yet, that is exactly what the present invention proposes.

FIG. 2(a) shows the magnetic field generated by a ring magnet made of an anisotropic magnetic material having its preferred direction in the Z-axis, and being "axially magnetized", also referred to herein as "vertically magnetized". As is known in the art, the magnetic field of such a magnet changes direction abruptly at the transitions between North and South poles.

FIG. 2(b) is a computer plot showing the magnitude of the Z-component of the magnetic field of the magnet of FIG. 2(a) for points of the magnet.

FIG. 2(c) shows mathematical formulas that describe the magnetic field components in the X, Y and Z direction of the axially magnetized anisotropic magnet shown in FIG. 2(a), at points "p" located on the magnet, where "Br" refers to "remanent field". As can be seen, the Bx and By components are zero, and the Bz-component is constant, but changes sign every 90°. The amplitude of the magnetic field measured at these points is typically in the order of about 230 mT.

FIG. 3 (top row) shows simulated plots of the magnetic field components Bx, By, Bz of a magnetic field created by an exemplary anisotropic and axially magnetized ring magnet having the same dimensions as the exemplary ring magnet shown in FIG. 1(a), i.e. a thickness h1=3.5 mm, inner diameter d1=5.0 mm, outer diameter d2=14.0 mm, as can be measured in a plane located at a distance dz of 1.5 mm.

FIG. 3 (second row and bottom row) also show the spatial field gradients dBx/dx, dBx/dy, dBy/dy, dBy/dx, dBz/dy, dBz/dx which can be derived therefrom.

As can be seen, even though the Bx and By values of the magnetic field are zero in points on the magnet itself (see FIG. 2c), the values Bx and By are not zero at every point in a plane φ at a small distance (e.g. about 1.5 mm) from the magnet. They are especially large at the transitions between the poles.

The main purpose of FIG. 3 however, is to show that the magnetic field gradients dBx/dy and dBy/dx (indicated with a dotted rectangular region) are substantially constant inside a central region having a diamond shape. This is in agreement with FIG. 14 and FIG. 15 of WO2014029885A1, showing that "the amplitude" of the in-plane field component Br(r) and Bt(r) varies more or less linearly in the "linear region" as a function of the radius. The actual values of the measured gradients dBx/dy and dBy/dx vary like a sine and a cosine function of θ, hence by measuring these orthogonal gradients, the angular position can be determined for example by using an arctan function.

Figure 4:
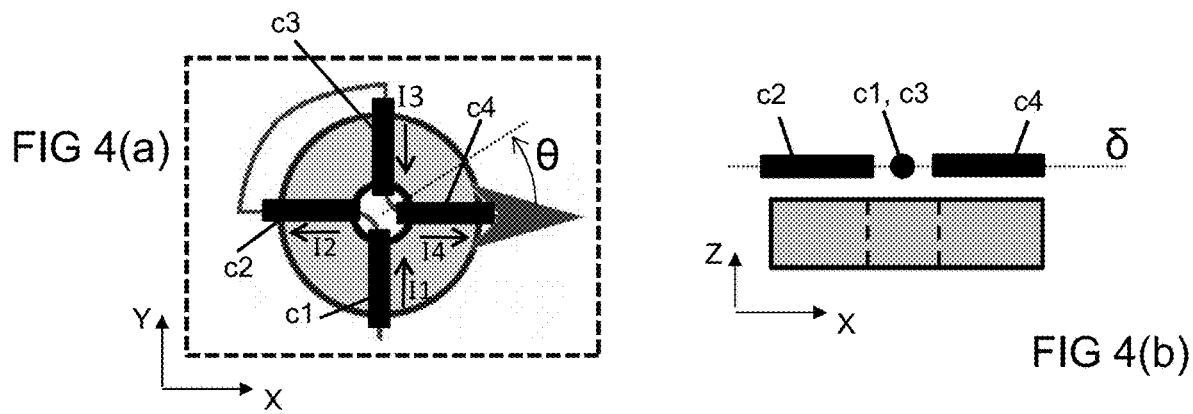
FIG. 4(a) shows an arrangement (in top view) of a jig comprising a ring magnet made of an isotropic magnetic material, illustrating a method of producing a magnet according to an embodiment of the present invention.
FIG. 4(b) shows the arrangement of FIG. 4(a) in side view.
FIG. 4(c) shows mathematical formulas that describe the components of the remanent magnetic field in the X, Y and Z direction of the isotropic magnet shown in FIG. 4(a) and FIG. 4(b).
FIG. 4(d) shows a mathematical formula that can be used to calculate an angular position of the sensor device relative to the magnet, based on in-plane field gradients.

FIG. 4(a) and FIG. 4(b) are a schematic representation (in top view and in side view respectively) of a jig comprising a shaped body comprising or made of an isotropic magnetic material, to illustrate a method of producing a "magnet with a rotating magnetization" as described herein.

Figure 13:
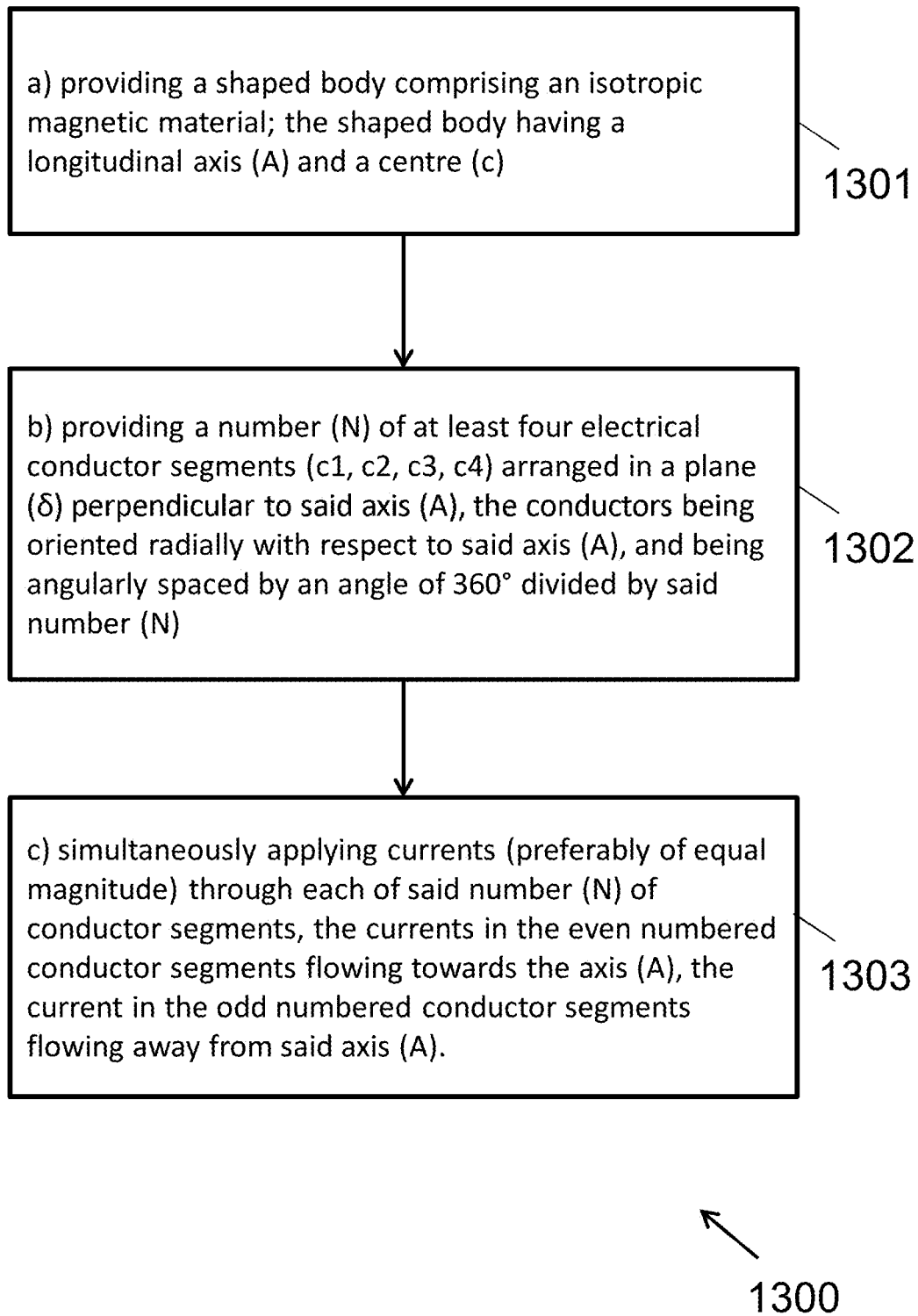

As illustrated by the flow-diagram of FIG. 13, the method comprises the following steps:

a) providing 1301 a shaped body comprising or consisting of an isotropic magnetic material; the shaped body having a central axis A and a centre c.

b) providing 1302 a number (N) of at least four electrical conductor segments c1, c2, c3, c4 arranged in a plane δ perpendicular to said axis A, the conductor segments being oriented radially with respect to said axis A, and being angularly spaced by an angle of 360° divided by said number N. In the example shown, N is equal to four, thus there are four conductor segments angularly spaced by 90°. It is noted that the electrical conductor segments may be interconnected. They may for example be part of a single electrically conductive wire, or part of two electrically conductive wires, or part of three electrically conductive wires. The distance between the magnet surface and the plane δ is preferably as small as possible.

c) simultaneously applying currents (preferably of equal magnitude) through each of said number N of conductor segments c1, c2, c3, c4, the currents in the even numbered conductor segments flowing towards the axis A, the current in the odd numbered conductor segments flowing away from said axis A, assuming that the conductors are numbered consecutively so that the even number and odd numbered conductor segments are interleaved.

The current used may be at least 1 kA, preferably at least 2 kA, preferably at least 5 kA, or at least 10 kA, or at least 20 kA, or at least 30 kA, or at least 40 kA, or at least 50 kA, e.g. about 60 kA.

The ring magnet may optionally have radial grooves (not shown) for accommodating the conductor segments. These grooves offer the further advantage that they allow to easily recognize the weak side and the strong side of the magnet, as will become clear when discussing FIG. 9, and thus help to avoid misplacement.

FIG. 4(c) shows mathematical formulas that describe the magnetic field components in the X, Y and Z direction of the isotropic four-pole magnet shown in FIG. 4(a) and FIG. 4(b) for points of the magnet itself. As can be appreciated from these formulas, this magnetic field is independent on the radial position on the magnet (see also FIG. 5). The formulas of FIG. 4(c) are valid for a four-pole magnet, but can be generalized to multipole-magnets, as follows:

$$\begin{pmatrix} Br_x \\ Br_y \\ Br_z \end{pmatrix} = Br_{isotropic} \begin{pmatrix} \sin(\theta)\cos(N\theta/2) \\ -\cos(\theta)\cos(N\theta/2) \\ \sin(N\theta/2) \end{pmatrix}$$

where N is the number of poles as can be seen from a point on the axis, at a distance from the magnet, which is also equal to the number of conductive segments of a jig as in FIG. 4(a).

FIG. 4(d) shows a mathematical formula that can be used to calculate an angular position of the sensor device 102 relative to the four-pole magnet, if the sensor device is located in a plane φ (e.g. as shown in FIG. 1), and has a plurality of at least three sensor elements 804 which are not collinear, i.e. which are not located on a single straight line. In practice however, it is preferred to measure the field gradients by at least four sensor elements which are located on two perpendicular lines, preferably on a circle, e.g. as shown in FIG. 8, e.g. as described in more detail in WO2014029885A1. The formulas of FIG. 4(d) are valid for a four-pole magnet, but can be generalized to multipole-magnets, as follows:

$$\theta_m = \arctan2\left(\frac{\frac{\delta B_x}{\delta y} + \frac{\delta B_y}{\delta x}}{\frac{\delta B_x}{\delta x} - \frac{\delta B_y}{\delta y}}\right) / (N/2)$$

where N is the number of poles as can be seen from a point on the axis, at a distance from the magnet, which is also equal to the number of conductive segments of a jig as in FIG. 4(a).

Figure 5:
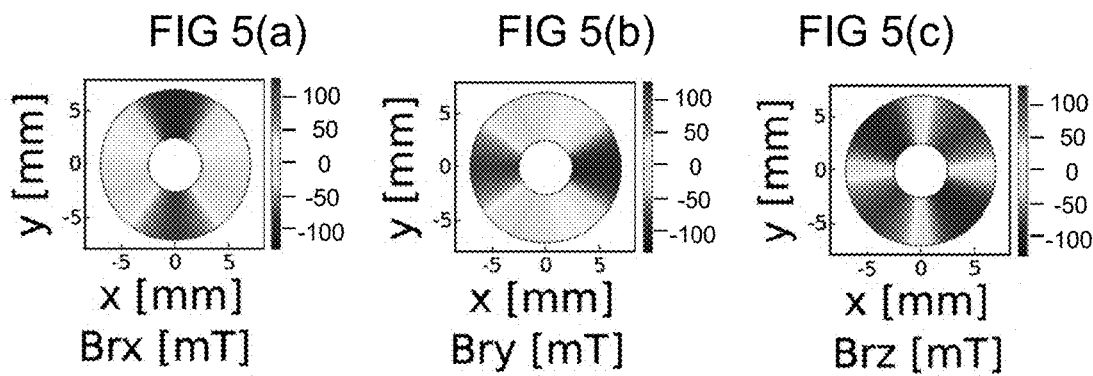
FIG. 5 shows simulated plots of the magnetic field values Bx, By, Bz of the isotropic magnet magnetized according to the method shown in FIG. 4(a) and FIG. 4(b).

FIG. 5 shows simulated plots of the magnetic field values Bx, By, Bz of the isotropic magnet magnetized according to the method shown in FIG. 4(a) and FIG. 4(b) and FIG. 13, for points of the magnet itself (not for points inside the central opening).

As can be appreciated from FIG. 5, the ring magnet has a rotation symmetry period of 180° (meaning that the magnetization of the magnet looks the same when the ring magnet is rotated over 180° about the central axis A. For a six-pole magnet, the rotation symmetry period would be 360°/3=120°, for an eight-pole the period would be 360°/4=90°, etc.

Figure 6:
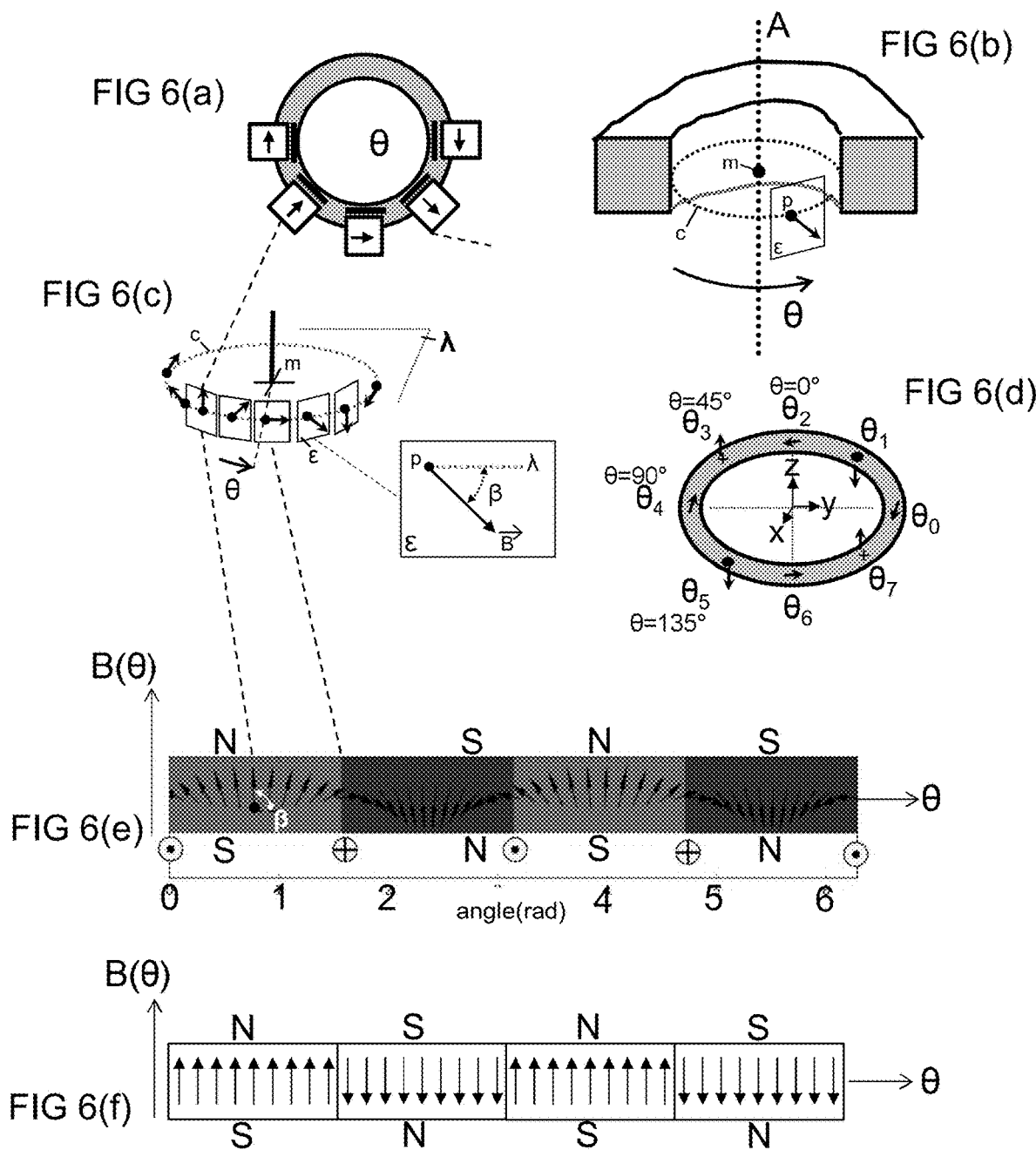
FIG. 6 shows a 3D representation of the magnetic field generated by a ring magnet magnetized as shown FIG. 4(a), corresponding with the 2D representation shown in FIG. 5.
Figure 7:
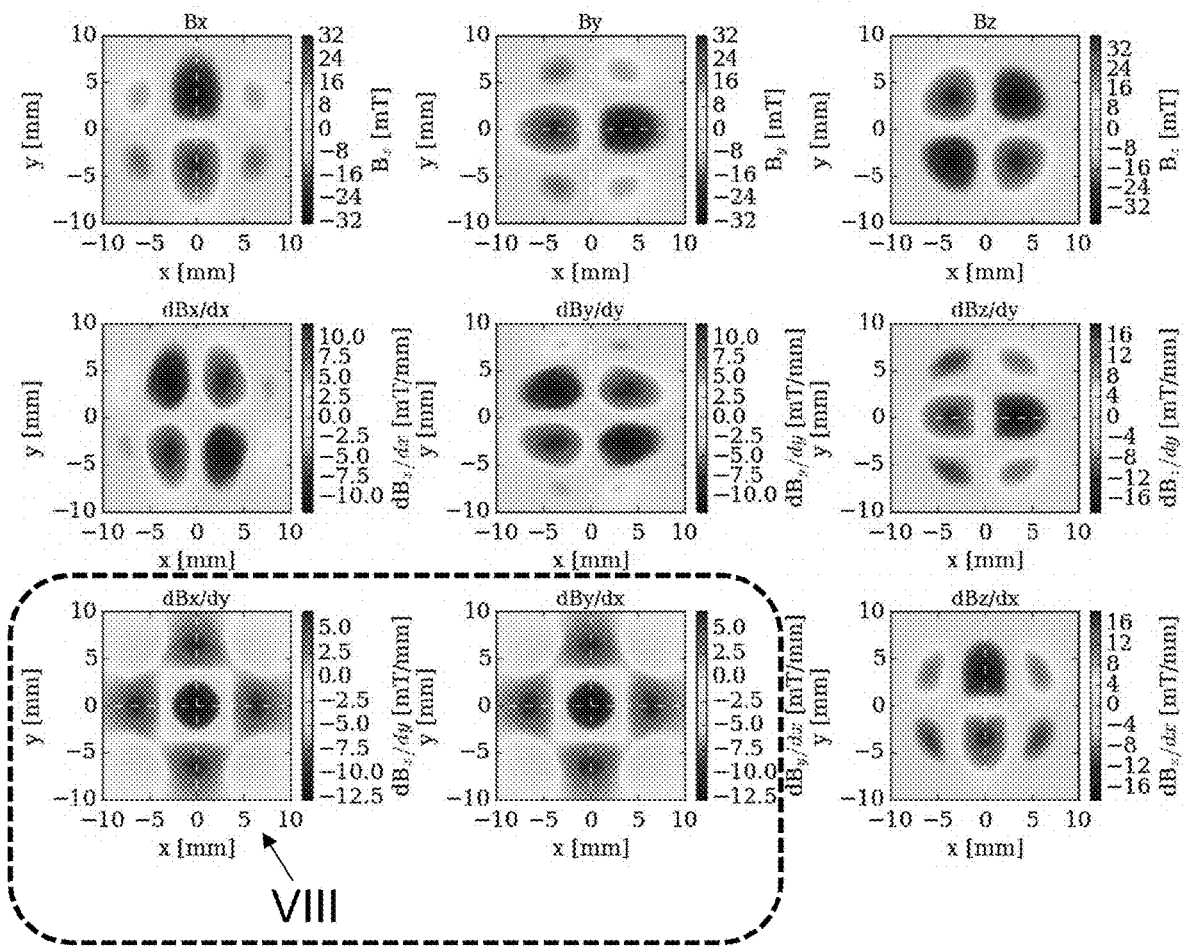
FIG. 7 shows simulated plots of the magnetic field values Bx, By, Bz of an isotropic magnet proposed by the present invention, magnetized as shown in FIG. 4, and having the same dimensions as the magnet of FIG. 3, as can be measured in a plane located at a distance of 1.5 mm from the magnet, and also shows spatial field gradients dBx/dx, dBx/dy, dBy/dy, dBy/dx, dBz/dy, dBz/dx derived therefrom.

FIG. 6 is a 3D representation of the magnetic field of a ring magnet magnetized as shown in FIG. 4(a) and FIG. 4(b), which is in agreement with the 2D representation shown in FIG. 5.

FIG. 6(a) and FIG. 6(b) show a ring magnet having an axis "A", and show a virtual circle "c" having a centre "m" substantially located on the axis A (in practice it may be slightly shifted), and show a point "p" located on that virtual circle "c", and show a plane "ε" parallel to the axis A and tangential to the virtual circle "c" and containing said point "p", and show that the magnetic field vector B is located inside that tangential plane ε.

FIG. 6(c) shows several points "p" on the virtual circle "c", and shows for each of these points how the magnetic field vector B "rotates" inside the tangential plane ε, as the point "p" moves along the circle. Or stated in other words, shows how the angle β between a plane λ perpendicular to the axis A and the magnetic field vector B varies as a function of the angular position θ of the point p on the virtual circle c. A magnet so magnetised is therefore referred to herein as an "isotropic magnet with rotating magnetic field" or "isotropic magnet with rotating magnetisation".

FIG. 6(d) shows the magnetic field vector B in eight specific points on the ring magnet of FIG. 6(a). As can be seen, the magnetic field B is oriented in the direction of the positive Z axis in two angular positions (θ3, θ7); and
is oriented in the direction of the negative Z axis in two angular positions (θ1, θ5); and
is oriented in the direction of the positive X axis in one angular position (θ0); and
is oriented in the direction of the negative X axis in one angular position (θ4); and
is oriented in the direction of the positive Y axis in one angular position (θ6); and
is oriented in the direction of the negative Y axis in one angular position (θ2), where the X, Y and Z axis are orthogonal axes of a Cartesian coordinate system located in the centre c, and where the Z-axis coincides with the central axis A of the magnet.

FIG. 6(e) is a 2D representation showing how the magnetic field vector of the magnet of FIG. 6(a) "rotates" inside the tangential planes ε as a function of the angle θ which defines the angular position of the point "p" on the circle "c". In preferred embodiments, the angle β varies substantially linearly as a function of θ.

FIG. 6(f) is a 2D representation similar to that of FIG. 6(e), but for the vertically magnetized anisotropic magnet of FIG. 2, for comparison.

FIG. 7 (top row) shows simulated plots of the magnetic field values Bx, By, Bz of an isotropic magnet having the same dimensions as the exemplary magnet described above (h1=3.5 mm, d1=5.0 mm, d2=14.0 mm), but magnetised using the method of FIG. 13, for example by making use of the jig shown in FIG. 4(a).

FIG. 7 (second and third row) show the spatial field gradients dBx/dx, dBx/dy, dBy/dy, dBy/dx, dBz/dy, dBz/dx derived therefrom. It was completely unexpected and it is actually quite astonishing that the diamond-shape of FIG. 3 is converted into an almost perfect circle.

FIG. 8 is a grayscale version of an enlarged view of the plot dBx/dy of FIG. 7 (bottom left), with four white dots added, representing four sensor elements 804 of a sensor device 102 that may be arranged relative to the magnet in the central circular area, at a distance from the magnet.

It can be appreciated from FIG. 7 and FIG. 8 that the in-plane field gradients (in particular dBx/dy and dBy/dx) of the "isotropic ring magnet with rotating magnetic field" as described herein are more uniform than the field gradients of the "anisotropic vertically magnetized ring magnet" shown in FIG. 2 and FIG. 3, and moreover, in a larger area. One of the reasons being that the circle of FIG. 8 is convex, whereas the diamond-shape of FIG. 3 is concave.

The fact that the amplitude of the gradients is substantially constant within this circle means that the amplitude of the field gradients measured anywhere within the circular region is substantially independent of the offset position, but only dependent on the angle θ between the sensor device and the ring magnet, in contrast to the magnet of FIG. 3, where the amplitude slightly varies, and thus the values of the field gradients not only depend on said angle θ, but also (to a larger degree) on the offset position.

But the circular shape also offers another advantage, schematically illustrated in FIG. 8(b), namely it allows two or three sensor structures to be placed inside the circle instead of only one, without significantly decreasing the accuracy.

In an embodiment, the sensor device 102 contains two semiconductor dies embedded in a single package. This embodiment provides redundancy, which allows to detect defects, which is very important in some applications, e.g. in automotive applications. It is moreover beneficial that the two sensor structures, e.g. semiconductor dies are located at substantially the same distance from the magnet, thus will measure substantially the same signal.

In a particular embodiment, the sensor device 102 contains three sensor structures, e.g. three semiconductor dies, all of which can be located inside the circular area. Such a sensor device not only allows to detect errors, but also to correct a potential defect, for example by discarding one of the three values which deviates most from the others.

While the advantages of redundancy are known per se in the art, it is the circular shape related to the "isotropic magnet with rotating magnetization" that makes it possible to use redundancy for smaller magnet sizes than is possible for the diamond shape, or stated in other words, that allows to shrink the size of a redundant angular sensor system.

But the inventors encountered another surprise, as will be explained referring to FIG. 9. The rotating magnetization also induces an asymmetric magnetic field, resulting in an effective magnetic gain on one side of the magnet.

FIG. 9(a) shows the magnet portion of FIG. 6(b) arranged relative to a sensor device. The purpose of this drawing is to make clear what is meant with the rectangular cross sections of FIG. 9(b) to FIG. 9(e).

FIG. 9(b) and FIG. 9(d) show computer-simulations of the amplitude |β| of the magnetic field of an "anisotropic quadrupole ring magnet with vertical magnetisation" having the exemplary dimensions mentioned above (h1=3.5 mm, d1=5.0 mm, d2=14.0 mm), in color and in grayscale respectively. In the colour picture a white line segment is shown to indicate the typical position of a sensor device, in the grayscale picture a black line segment is shown. As can be seen, the amplitude of the magnetic field is substantially the same on either side of the magnet (above or below), there is no amplification, but the magnetic field strength of the anisotropic magnet is already relatively large.

FIG. 9(c) and FIG. 9(e) show computer-simulations of the amplitude |β| of the magnetic field of an "isotropic quadrupole ring magnet with rotating magnetisation" as described above, having the same exemplary dimensions mentioned above (h1=3.5 mm, d1=5.0 mm, d2=14.0 mm), in color and in grayscale respectively. In the colour picture a white line segment is shown to indicate the typical position of a sensor device 102, in the grayscale picture a black line segment is shown. As can be seen, the amplitude of the magnetic field is stronger at the bottom side of the magnet than at the top side. The sensor device 102 is preferably located at the side of the magnet where the field is stronger.

Surprisingly the passive amplification makes the magnetic field of the isotropic magnet (with a typical maximum remanent magnetic field strength of 120 mT) almost equally strong as the magnetic field of the anisotropic magnet (with a typical maximum remanent magnetic field strength of 230 mT). This is better shown in FIG. 9(f).

Figures 9, 9F:
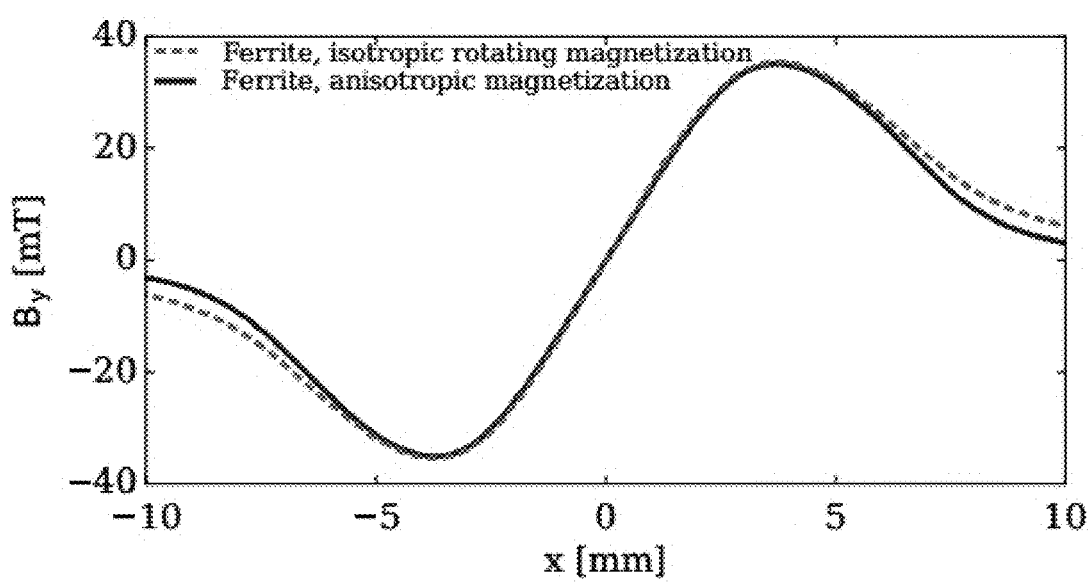
FIG. 9(f) shows a comparison of the field By along the X-axis for the anisotropic magnet of FIG. 9(b) and FIG. 9(d) and the isotropic magnet of FIG. 9(c) and FIG. 9(e).

FIG. 9(f) shows the field By along the X-axis. Due to the magnetic gain of the rotating magnetization, equivalent magnetic field strength is obtained for the "vertically magnetised anisotropic ferrite" and the "isotropic ferrite with rotating magnetisation", despite the much weaker remanent magnetization of isotropic ferrite as compared to anisotropic ferrite.

Figure 10:
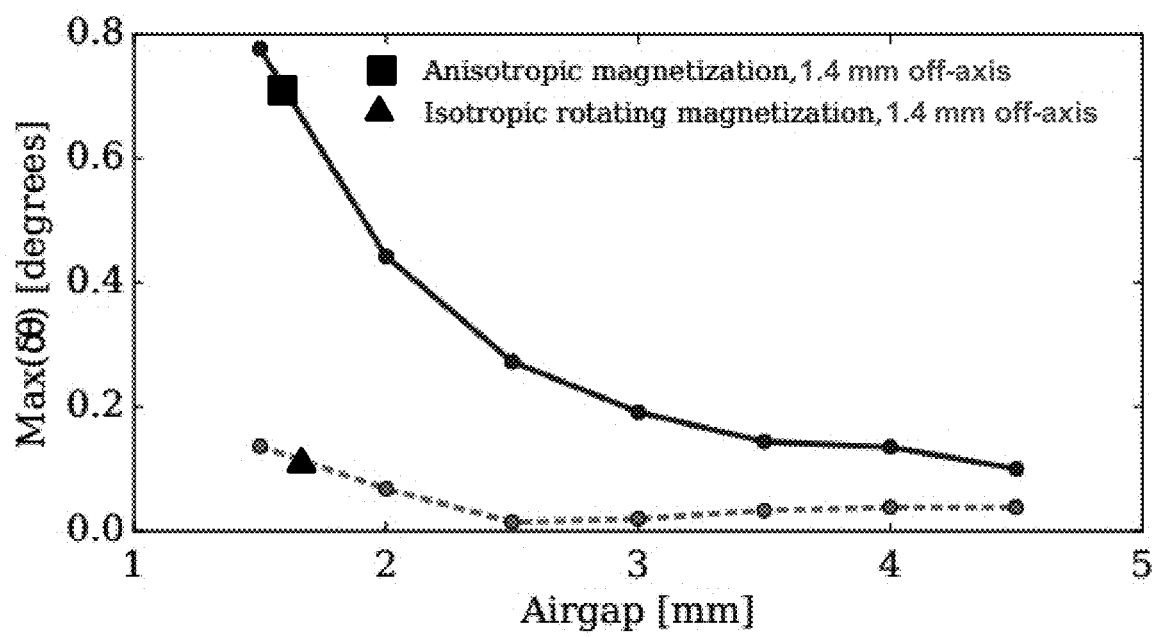
FIG. 10 shows a simulation of the maximum position error (over the angular range) of the sensor system of FIG. 1 when using an exemplary "anisotropic quadrupole ring magnet with vertical magnetisation" having an outer diameter of 14 mm (curve with square) versus using an "isotropic ring magnet with rotating magnetization" as proposed by the present invention (curve with triangle) for a radial offset of 1.4 mm and various axial positions (airgap) ranging from 1.5 mm to 4.5 mm.
Figure 11:
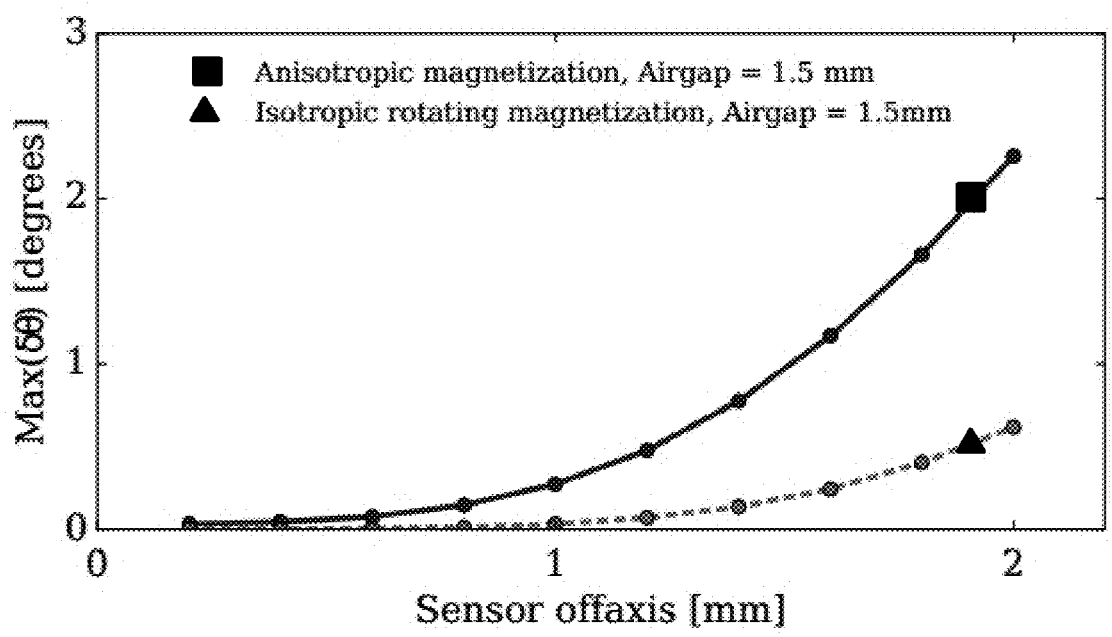
FIG. 11 shows the maximum position error (over the angular range) of the sensor system of FIG. 1 when using said exemplary "anisotropic four-pole ring magnet with vertical magnetisation" having an outer diameter of 14 mm (curve with square) versus using an "isotropic four-pole ring magnet with rotating magnetization" as proposed by the present invention (curve with triangle) for an axial distance of 1.5 mm and various radial offsets ranging from 0.2 to 2.0 mm.

FIG. 10 and FIG. 11 explain how this translates into a reduced sensitivity to axial and/or radial position errors.

FIG. 10 shows the maximum position error (over the angular range) of the sensor system 100 of FIG. 1 using an "anisotropic ring magnet with vertical magnetisation" (curve with square) and using an "isotropic ring magnet with rotating magnetic field" as proposed in this document, the magnets having the exemplary dimensions mentioned above, for a position sensor 102 located at a radial offset of dr=1.4 mm and for various axial positions (airgap) varying from 1.5 mm to 4.5 mm.

As can be appreciated, the maximum error is much lower for the sensor system with the "isotropic magnet with rotating magnetic field", hence this magnet can significantly improve robustness against axial and/or radial displacement of the magnet 101 relative to the sensor device 102, or stated in other terms, the "isotropic magnet with rotating magnetic field" as described herein can significantly improve accuracy and can significantly reduce the impact of mechanical offset drift over the lifetime of the sensor system 100.

The (worst case) angular error (at a certain airgap and off-axis) was calculated as the maximum difference between the measured angle $\theta_m$ and the actual angle $\theta$ over a full rotation, using the formula: $\delta\theta_{max}$=max $|\theta-\theta_m|$, where $\theta_m$ was calculated with the formula mentioned in FIG. 4(d).

FIG. 11 shows the maximum position error (over the angular range) of the sensor system 100 of FIG. 1 when using an "anisotropic ring magnet with vertical magnetisation" (curve with square) and when using an "isotropic ring magnet with rotating magnetic field" as proposed by the present invention (curve with triangle), the magnets having the exemplary dimensions mentioned above, for a position sensor located at an axial distance (or airgap dz) of 1.5 mm for various radial offset values (dr) ranging from 0.2 to 2.0 mm.

As can be seen from the curve with the triangle, using the anisotropic ring magnet, the error is about 2,2° (for an off-axis of about 2.0 mm), whereas the error is lower than about 0.7° using the isotropic ring magnet. That is an improvement by a factor of 3.

So far, the invention is described using a ring magnet as an example, but the present invention is not limited thereto, and other shapes can also be used.

FIG. 12 shows several other shapes of an "isotropic magnet with rotating magnetic field" as can be used in embodiments of the present invention. Only a portion of the magnet is shown for illustrative purposes. In FIG. 12(a) the magnet is a ring magnet with a cylindrical through-opening and a cylindrical outer wall. In FIG. 12(b) the magnet is a ring magnet with a conical through-opening and a cylindrical outer wall. In FIG. 12(c) the magnet has a cylindrical through-opening in a beam-shaped object having an outer surface with a square cross-section. In FIG. 12(d) the magnet has a conical through-opening in a beam-shaped object having an outer surface with a square cross-section. In FIG. 12(e) the magnet is a disk magnet with a cylindrical cut-out.

The present invention works for magnets with a cylindrical or conical opening (through-opening or cut-out), but also works with other surfaces of revolution, for example a paraboloid or ellipsoid opening or cut-out, and even for shapes without an opening or cut-out, as shown for example in FIG. 12(g) showing a circular disk magnet without a central opening or cut-out.

While a ring shape or disk shape is preferred, the invention will also work with other outer geometries, for example a square, a hexagon or an octagon, or another polygonal shape.

FIG. 12(f) shows a variant of the magnet of FIG. 12(a) having two central openings, a first opening (e.g. at the top) having a first inner diameter, and a second concentric opening (e.g. at the bottom) having a second inner diameter, different from the first diameter. Other variants are also possible.

As already mentioned above, each of these shapes can furthermore have radial grooves for accommodating the conductor segment(s) for magnetizing the magnet.

While not explicitly shown, the principles of the present invention can also be combined with the principles explained in EP3321638(A1), which document is incorporated herein by reference in its entirety, but especially FIG. 15 (adding two identical cylindrical dipoles, arranged on opposite sides of the ring or disk magnet) and FIG. 32 and FIG. 33 (adding two vertically magnetized partial ring magnets, arranged on opposite sides of the ring or disk magnet), and the algorithm of FIG. 17 for determining an angular position in a 360° angular range. In this way, the advantages of the present invention can be combined with the "angular range extension principle" described in EP3321638(A1).

While individual features are explained in different drawings and different embodiments of the present invention, it is contemplated that features of different embodiments can be combined, as would be obvious to the skilled person, when reading this document.

Finally, while the invention has been described for the "ideal case" where the magnetic field in the magnet can be expressed by the formulas of FIG. 4(c), the skilled person will understand that in practice, the remanent magnetic field of an actual magnet will not be exactly equal to these formulas, but only approximately. It is important to realize however that the advantageous effects of being "highly robust against radial and axial drift" offered by the present invention are not directly dependent on how well the formulas of FIG. 4(c) are approximated, but instead on the homogeneity of the magnetic field induced outside of the magnet material, more in particular in a small cylindrical space at a small distance from the magnet. It is furthermore pointed out that although the formula of FIG. 4(d) expresses the ideal situation, in practice corrections to this formula can be included, and typically are included in the sensor device,

The invention claimed is:

1. A sensor system comprising:
a permanent magnet in the form of a multi-pole magnet comprising an isotropic magnetic material, the permanent magnet having an axis, and being magnetized such that the magnet creates a remanent magnetic field which, for each point of an imaginary circle located in a plane perpendicular to said axis and having a centre substantially located on said axis, is located substantially in a virtual plane tangential to said virtual circle in point and parallel to said axis, which magnetic field furthermore defines an angle relative to the plane containing the circle, which angle rotates as a function of the position of the point on the imaginary circle,
the magnet configured such that the remanent magnetic field generates an effective magnetic gain on a first side of the magnet relative to an opposite second side of the magnet; and
a sensor device arranged at the first side of the magnet at an axial distance from said magnet, and adapted for determining at least one magnetic quantity or at least one derived quantity or at least one magnetic field gradient created by said magnet.

2. The sensor system according to claim 1, wherein the sensor device comprises at least three magnetic sensor elements located in a plane perpendicular to the axis of the magnet at the first side of the magnet, the at least three magnetic sensor elements not being collinear.

3. The sensor system according to claim 1, wherein the sensor system is an angular position sensor system.

4. The sensor system according to claim 3, wherein the sensor device is adapted for determining one or more field gradients of the magnetic field created by the magnet, in a plane perpendicular to the axis, and is adapted for determining an angular position of the sensor device relative to the permanent magnet, based on said field gradients.

5. The sensor system according to claim 3, wherein the angular position is calculated based on the following formula or an equivalent formula:

$$\theta_m = \arctan2\left(\frac{\frac{\delta B_x}{\delta y} + \frac{\delta B_y}{\delta x}}{\frac{\delta B_x}{\delta x} - \frac{\delta B_y}{\delta y}}\right) / (N/2)$$

where N is an even integer number of at least 4, $\theta_m$ is the calculated angular position of the sensor device relative to the magnet, and wherein dBx/dy, dBy/dx, dBx/dx and dBy/dy are in-plane field gradients.

6. The sensor system according to claim 1, wherein the sensor device is adapted for determining four magnetic field gradients created by said magnet.

7. The sensor system according to claim 1, wherein the magnet has an opening or a cut-out with a tubular shape; and
wherein the imaginary circle is defined as the cross section of the plane perpendicular to the axis, and said tubular shape.

8. The sensor system according to claim 7, wherein the tubular opening or tubular cut-out is a cylindrical through-hole or a conical through-hole or a cylindrical cut-out or a conical cut-out.

9. The sensor system according to claim 1, wherein said angle rotates monotonically as a function of the position of the point on the imaginary circle; or
wherein said angle rotates substantially linearly as a function of the position of the point on the imaginary circle.

10. The sensor system according to claim 1, wherein the remanent magnetic field (Br) has magnetic field components (Brx, Bry, Brz) which, at points located on said circular cross section, can be expressed or approximated by the following set of formulas, or an equivalent set of formulas:

$$\begin{pmatrix} Br_x \\ Br_y \\ Br_z \end{pmatrix} = Br_{isotropic} \begin{pmatrix} \sin(\theta)\cos(N\theta/2) \\ -\cos(\theta)\cos(N\theta/2) \\ \sin(N\theta/2) \end{pmatrix}$$

where N is an integer value of at least 4, Brx, Bry and Brz is an x, y and z-component respectively of the remanent magnetic field, Brisotropic is a magnitude of the remanent magnetic field, and θ is an angle about the axis.

11. The sensor system according to claim 1, wherein an outer surface of the permanent magnet has a circular or a regular polygonal cross section with the plane that contains the virtual circle, for example a square or a hexagon or an octagon.

12. A sensor system comprising:
a permanent magnet in the form of a multi-pole magnet comprising an isotropic magnetic material, the permanent magnet having an axis, and being magnetized such that the magnet creates a remanent magnetic field which, for each point of an imaginary circle located in a plane perpendicular to said axis and having a centre substantially located on said axis, is located substantially in a virtual plane tangential to said virtual circle in point and parallel to said axis, which magnetic field furthermore defines an angle relative to the plane containing the circle, which angle rotates as a function of the position of the point on the imaginary circle,
the magnet configured such that the remanent magnetic field generates an effective magnetic gain on a first side of the magnet relative to an opposite second side of the magnet; and
a sensor device arranged at the first side of the magnet at an axial distance from said magnet, and adapted for determining at least one magnetic field gradient created by said magnet;
wherein the sensor device is arranged in a region of the magnetic field having a substantially constant gradient.

13. The sensor system according to claim 12, wherein the sensor device comprises at least three magnetic sensor elements located in a plane perpendicular to the axis of the magnet at the first side of the magnet, the at least three magnetic sensor elements not being collinear.

14. The sensor system according to claim 12, wherein the sensor system is an angular position sensor system.

15. The sensor system according to claim 14, wherein the sensor device is adapted for determining one or more field gradients of the magnetic field created by the magnet, in a plane perpendicular to the axis, and is adapted for determining an angular position of the sensor device relative to the permanent magnet, based on said field gradients.

16. The sensor system according to claim 14, wherein the angular position is calculated based on the following formula or an equivalent formula:

$$\theta_m = \arctan2\left(\frac{\dfrac{\delta B_x}{\delta y} + \dfrac{\delta B_y}{\delta x}}{\dfrac{\delta B_x}{\delta x} + \dfrac{\delta B_y}{\delta y}}\right) / (N/2)$$

where N is an even integer number of at least 4, θm is the calculated angular position of the sensor device relative to the magnet, and wherein dBx/dy, dBy/dx, dBx/dx and dBy/dy are in-plane field gradients.

17. The sensor system according to claim 12, wherein the sensor device is adapted for determining four magnetic field gradients created by said magnet.

18. The sensor system according to claim 12, wherein the magnet has an opening or a cut-out with a tubular shape; and
 wherein the imaginary circle is defined as the cross section of the plane perpendicular to the axis, and said tubular shape.

19. The sensor system according to claim 18, wherein the tubular opening or tubular cut-out is a cylindrical through-hole or a conical through-hole or a cylindrical cut-out or a conical cut-out.

20. The sensor system according to claim 12, wherein said angle rotates monotonically as a function of the position of the point on the imaginary circle; or
 wherein said angle rotates substantially linearly as a function of the position of the point on the imaginary circle.

21. The sensor system according to claim 12, wherein the remanent magnetic field (Br) has magnetic field components (Brx, Bry, Brz) which, at points located on said circular cross section, can be expressed or approximated by the following set of formulas, or an equivalent set of formulas:

$$\begin{pmatrix} Br_x \\ Br_y \\ Br_z \end{pmatrix} = Br_{Isotropic} \begin{pmatrix} \sin(\theta)\cos(N\theta/2) \\ -\cos(\theta)\cos(N\theta/2) \\ \sin(N\theta/2) \end{pmatrix}$$

where N is an integer value of at least 4, Brx, Bry and Brz is an x, y and z-component respectively of the remanent magnetic field, Brisotropic is a magnitude of the remanent magnetic field, and θ is an angle about the axis.

22. The sensor system according to claim 12, wherein an outer surface of the permanent magnet has a circular or a regular polygonal cross section with the plane that contains the virtual circle, for example a square or a hexagon or an octagon.

\* \* \* \* \*